(12) United States Patent
Thubert et al.

(10) Patent No.: US 7,633,921 B2
(45) Date of Patent: Dec. 15, 2009

(54) MOBILE NETWORK AUTOMATIC TUNNELS

(75) Inventors: Pascal Thubert, La Colle sur Loup (FR); Srinath Gundavelli, San Jose, CA (US); Alpesh S. Patel, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 564 days.

(21) Appl. No.: 11/602,292

(22) Filed: Nov. 21, 2006

(65) Prior Publication Data
US 2008/0117844 A1 May 22, 2008

(51) Int. Cl.
*H04B 7/00* (2006.01)
*H04W 4/00* (2006.01)
*H04L 12/28* (2006.01)
*H04W 40/00* (2006.01)

(52) U.S. Cl. .............. 370/338; 370/310; 370/328; 370/351; 370/392; 370/393; 455/445

(58) Field of Classification Search .......... 370/235, 370/237–238, 310, 328–329, 331, 338, 341, 370/351, 355–357, 392–393, 397, 399, 395.3–395.32; 455/422.1, 428, 432.1–432.3, 436–451, 452.1–452.2, 455/453, 509, 550.1, 556.2, 561; 709/221, 709/238–244
See application file for complete search history.

(56) References Cited

U.S. PATENT DOCUMENTS

| | | | | |
|---|---|---|---|---|
| 6,636,498 | B1 * | 10/2003 | Leung | 370/338 |
| 6,917,618 | B2 | 7/2005 | Thubert et al. | |
| 7,209,978 | B2 * | 4/2007 | Thubert et al. | 709/242 |
| 7,505,442 | B2 * | 3/2009 | Kniveton | 370/338 |
| 2004/0223491 | A1 | 11/2004 | Levy-Abegnoli et al. | |
| 2006/0140177 | A1 * | 6/2006 | Karhu | 370/356 |
| 2007/0061485 | A1 * | 3/2007 | Horton et al. | 709/245 |
| 2008/0256220 | A1 * | 10/2008 | Bachmann et al. | 709/222 |

OTHER PUBLICATIONS

Aura, Cryptographically Generated Addresses (CGA), Network Working Group, Request for Comments: 3972, Mar. 2005, pp. 1-22.
Carpenter et al., "Connection of IPv6 Domains via IPv4 Clouds", Network Working Group, Request for Comments: 3056, Feb. 2001, pp. 1-23.

(Continued)

*Primary Examiner*—Meless N Zewdu
(74) *Attorney, Agent, or Firm*—Leon R. Turkevich

(57) ABSTRACT

In one embodiment, a received data packet is delivered by a routing resource to a tunnel interface resource in response to determining that the received data packet specifies a destination address starting with a prescribed aggregation prefix. The tunnel interface resource computes a home address for a mobile router based on a second address prefix from a start of the destination address, the second address prefix within the prescribed aggregation prefix and having been assigned as reachable by the mobile router, at least a portion of the second address prefix applied to a prescribed mapping function. The tunnel interface resource determines a care-of address for reaching the mobile router based on the corresponding home address calculated by the tunnel interface resource, and encapsulates the received data packet into an encapsulated packet having a destination address field specifying the care-of address, for output of the encapsulated packet toward the mobile router.

20 Claims, 7 Drawing Sheets

OTHER PUBLICATIONS

Ernst et al., "Network Mobility Support Terminology", NEMO Working Group, Internet Draft <draft-ietf-nemo-terminology-04> Oct. 24, 2005, pp. 1-27.

Thubert et al., "NENI Home Network models", Network Mobility Internet Draft <draft-ietf-nemo-home-network-models-06> Feb. 17, 2006, pp. 1-23.

Devarapalli et al., "Network Mobility (NEMO) Basic Support Protocol", Network Working Group, Request for Comments: 3963, Jan. 2005, pp. 1-33.

Johnson et al., "Mobility Support in IPv6", IETF Network Working Group, Request for Comments: 3775, Jun. 2004, pp. 1-165.

* cited by examiner

MOBILE NETWORK AUTOMATIC TUNNELS

TECHNICAL FIELD

The present disclosure generally relates to deploying a home network between mobile routers and at least one home agent according to mobile IP protocols including the Internet Engineering Task Force (IETF) Request for Comments 3775 ("Mobility Support in IPv6") and RFC 3963 ("NEMO [Mobile Network] Basic Support Protocol").

BACKGROUND

Mobile networking has evolved to an extent that a mobile router can communicate with other nodes (e.g., "correspondent nodes") based on registering with a home agent specifying that an assigned home address for the mobile router is reachable via a specified care-of address, described in detail in RFC 3775 and RFC 3963. In addition, a "home network" can be extended into an "extended home network" based on an aggregation of one or more home networks and mobile networks, as described in the Internet Draft by Ernst, "Network Mobility Support Terminology", draft-ietf-nemo-terminology-04 (Oct. 24, 2005) and the Internet Draft by Thubert, "NEMO Home Network Models" draft-ietf-nemo-home-network-models-06 (Feb. 17, 2006).

Unfortunately, the requirements of RFC 3963 require a large number of tunnels to be generated by a home agent, including a bidirectional tunnel established between the mobile router and the home agent, where all network traffic to and from the mobile network (using the mobile router as a point of attachment) must be passed via the bidirectional tunnel. Further, RFC 3963 requires an authorization method for an explicit mode for binding updates that is difficult to implement because it requires that both a home agent and a mobile router be configured to ensure the mobile router uses the proper home address for assigned mobile network prefixes; additional authentication protocols for binding updates are required under RFC 3775. Consequently, substantial processing burdens are imposed on the network device executing the home agent resource, including maintaining the multiple tunnel states for each of the registered mobile routers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
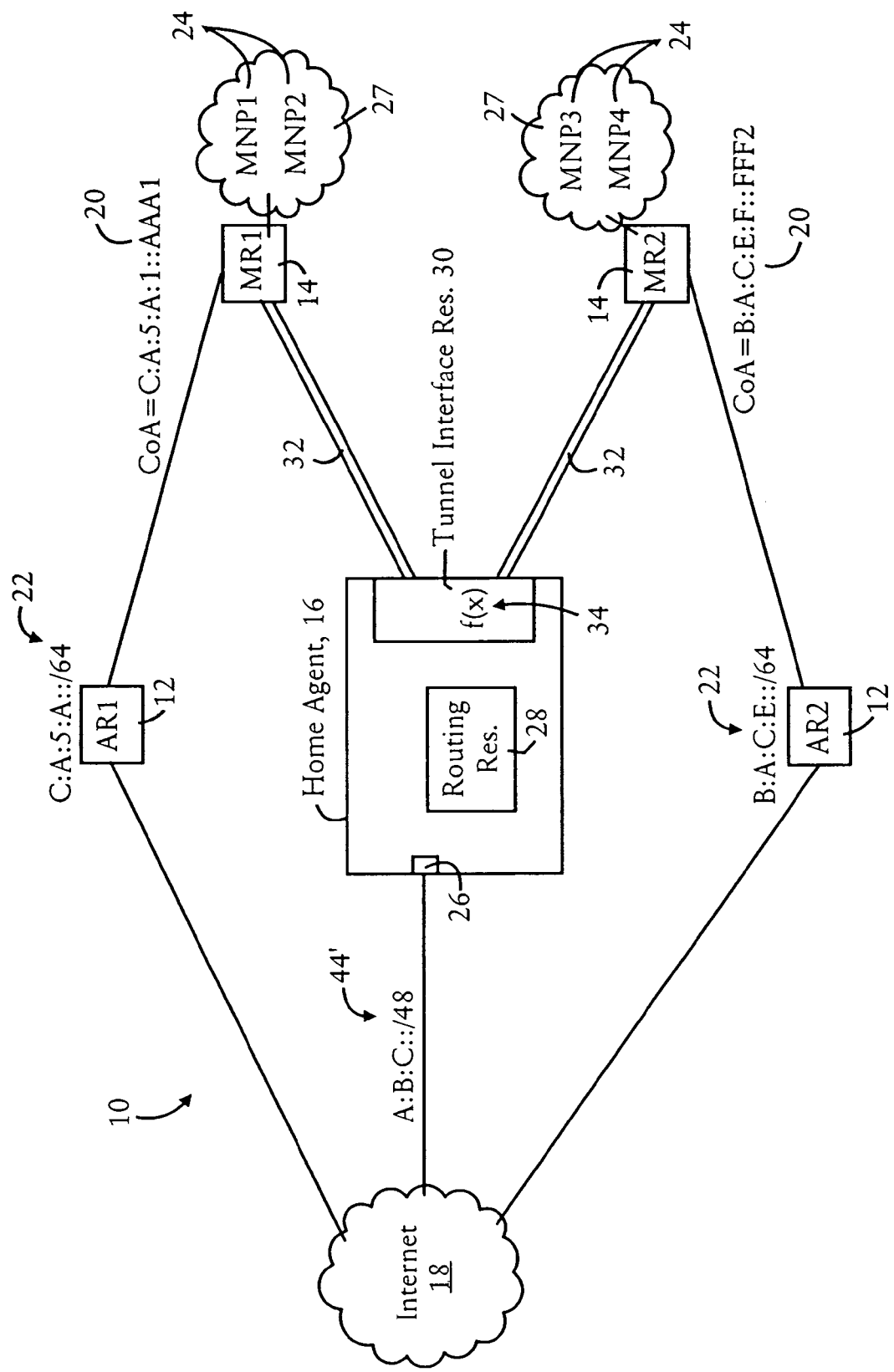
FIG. 1 illustrates an example network including a home agent and mobile routers for implementing automatic tunnels according to an example embodiment.

In one embodiment, a method comprises delivering a received data packet by a routing resource to a tunnel interface resource in response to the routing resource determining that the received data packet specifies a destination address starting with a prescribed aggregation prefix. The method further comprises computing, by the tunnel interface resource, a home address for a mobile router based on a second address prefix from a start of the destination address, the second address prefix contained within the prescribed aggregation prefix and having been assigned as reachable by the mobile router, the home address computed based on the tunnel interface resource applying at least a portion of the second address prefix to a prescribed mapping function. The method further comprises determining by the tunnel interface resource a care-of address for reaching the mobile router based on the corresponding home address having been calculated by the tunnel interface resource. The method further comprises encapsulating, by the tunnel interface resource, the received packet into an encapsulated packet having a destination address field specifying the care-of address, for output of the encapsulated packet toward the mobile router.

In another embodiment, an apparatus comprises a tunnel interface resource executed by the apparatus, and a routing resource executed by the apparatus. The routing resource is configured for delivering a received data packet to the tunnel interface resource in response to the routing resource determining that the received data packet specifies a destination address starting with a prescribed aggregation prefix. The tunnel interface resource is configured for computing a home address for a mobile router based on a second address prefix from a start of the destination address, the second address prefix contained within the prescribed aggregation prefix and having been assigned as reachable by a mobile router, the tunnel interface resource configured for computing the home address based on applying at least a portion of the second address prefix to a prescribed mapping function. The tunnel interface resource further is configured for determining a care-of address for reaching the mobile router based on the corresponding home address having been calculated by the tunnel interface resource. The tunnel interface resource further is configured for encapsulating the received data packet into an encapsulated packet having a destination address field specifying the care-of address, for output of the encapsulated packet toward the mobile router.

DETAILED DESCRIPTION

Particular embodiments disclosed herein implement a home agent, compliant with existing mobile network protocols including as RFC 3775 and RFC 3963, by adding a tunnel interface resource to a router having a routing resource configured for executing Internet Protocol (IP)-based routing operations. Execution of the routing resource by the router (e.g., execution by a processor within the router of router code loaded in router memory) causes the routing resource to output a received IP data packet to an identified output resource, for example a link layer resource configured for encapsulating the received IP data packet in a link layer packet (e.g., gigabit ethernet or wireless ethernet) for transmission via a corresponding output port onto a communication link (e.g., a gigabit ethernet link or an IEEE 802.11 communication link).

The routing resource also is configured to identify the tunnel interface resource as an available output resource if the destination address for the received IP data packet identifies a prescribed aggregation prefix assigned to the tunnel interface resource. Execution of the tunnel interface resource by the router (e.g., execution by the processor within the router of tunnel interface code loaded in router memory) enables the routing resource to output an IP data packet, destined for a prescribed aggregation prefix, to the tunnel interface: the tunnel interface resource, configured for performing mobile IP operations, also is configured for computing a home address providing reachability for the destination based on applying a prescribed mapping function to a prescribed address prefix from the destination address. The tunnel interface resource determines a care-of address for reaching the computed home address based on accessing an associated binding cache; the tunnel interface resource further encapsulates the received data packet into an encapsulated packet having a destination address field that specifies the care-of address. The encapsulated packet is then output by the tunnel interface resource back to the routing resource for routing according to the existing routing protocols.

Hence, the tunnel interface resource automatically creates a virtual tunnel between the home agent and a mobile router, based on encapsulating a received packet destined for the mobile router with a mobile IP header that specifies a care-of address for the mobile router.

FIG. 1 illustrates an example network 10 that includes access routers 12 that provide reachability for mobile routers 14 to a home agent 16 via a wide area network 18, such as the Internet. Each access router 12 and the home agent 16 are configured for providing reachability for prescribed address prefixes 22 in accordance with existing IP-based writing protocols. For example, the access router "AR1" 12 advertises that it provides reachability for the Internet Protocol version 6 (IPv6) address prefix "C:A:5:A::/64" 22; the access router "AR2" 12 advertises that it provides reachability for the IPv6 address prefix "B:A:C:E::/64" 22; and the home agent 16 advertises that it provides reachability for the IPv6 address prefix "A:B:C::/48" (other address prefixes also may be advertised by the router 16 implementing the home agent). Hence, any packet having a destination address starting with the address prefix "C:A:5:A::/64" 22 is routed via the Internet 18 to the access router "AR1" 12; any packet having a destination address starting with the address prefix "B:A:C:E::/64" 22 is routed via the Internet 18 to the access router "AR2" 12; and any packet having a destination address starting with the address prefix "A:B:C::/48" 22 is routed via the Internet 18 to the home agent 16.

In accordance with existing mobile network protocols including RFC 3775 and RFC 3963, each mobile router (e.g., "MR1" and "MR2") 14 is assigned at least one unique home address that is contained within the prescribed aggregation prefix "A:B:C::/48" (mobile aggregation prefix) 44' that is assigned to the home agent 16. Hence, any packet having a destination address specifying a home address for a mobile router (e.g., MR1) 14 is routed via the Internet 18 to the home agent 16. Each mobile router (e.g., "MR1") 14 also is configured for attaching to at least one access router (e.g., "AR1") 12 by obtaining a corresponding care-of address (e.g., CoA="C:A:5:A:1::AAA1") 20 that is within the prefix (e.g., "C:A:5:A::/64") 22 of the corresponding access router 12; each mobile router (e.g., "MR1") 14 also sends a binding update message to its home agent 16 to specify that the corresponding home address (HAddr) assigned to the mobile router 14 is reachable via the care-of address (e.g., CoA="C: A:5:A:1::AAA1") 20. Each mobile router (e.g., "MR1") 14 also may explicitly specify mobile network prefixes (e.g., "MNP1", "MNP2") 24 that are reachable by the corresponding mobile router using the corresponding specified care-of address 20, providing reachability for a mobile hosts within the mobile network 27 that is serviced by the corresponding mobile router 14.

The home agent 16 is implemented as a router that includes a network port 26 configured for sending and receiving data packets to and from the Internet 18, a routing resource 28, and at least one tunnel interface resource 30. Packets received by the network port 26 from the Internet 18 are forwarded to the routing resource 28 for routing. As described in further detail below with respect to FIGS. 2 and 4, the mobile routers 14 and the associated mobile network prefixes 24 are configured for operating within a prescribed mobile aggregation, for example "A:B:C::/48" that is assigned to the tunnel interface resource 30; the routing resource 28 also is configured for outputting to the tunnel interface resource 30 any packet having a destination address within the prescribed mobile aggregation prefix 44', based on a routing table entry specifying the prescribed mobile aggregation prefix (expressed in the routing table entry as a "port aggregation") 44' reachable via the tunnel interface resource 30. As described below with respect to FIG. 2, any packet having a destination address starting with the prescribed mobile aggregation prefix "A:B: C::/48" 44' of the home agent 16 is delivered by the routing resource 28 to a tunnel interface resource ("VI_2") 30.

The tunnel interface resource 30 is configured for implementing all home agent operations for the corresponding assigned mobile aggregation prefix 44'. In particular, the tunnel interface resource 30 is configured for automatically establishing mobile IP tunnels 32 between the home agent 16 and the mobile routers 14 based on performing binding update operations with the mobile routers 14, and performing encapsulation of packets destined for the mobile routers. The tunnel interface resource 30 automatically establishes the mobile IP tunnels 32 based on computing a home address for a mobile router 14 using a prescribed mapping function 34: the prescribed mapping function 34 identifies and establishes a prescribed relationship between the mobile network prefixes 24 and the home addresses of the mobile routers 14, as well as the mobile network prefixes utilized by the mobile routers, where the mobile network prefixes 24, the home addresses of the mobile routers 14, and the mobile network prefixes utilized by the mobile routers 14 all are encompassed within the prescribed mobile aggregation prefix 44'. The tunnel interface resource 30 also is configured for creating and maintaining binding cache entries (BCEs) for reaching the mobile routers via the specified care-of addresses 20, based on validating the binding update messages from the mobile routers by using the prescribed mapping function 34.

Hence, the tunnel interface resource 30 is configured for performing all home agent-related operations with respect to the mobile routers 14, including encapsulation of received packets for delivery to the mobile routers 14, based on automatically calculating the home address for the mobile routers using prefix information from destination address fields of the received packets. The encapsulated packets are then forwarded by the tunnel interface resource 30 back to the routing resource 28 for output according to existing routing protocols. Hence, each of the mobile routers 32 communicate with the home agent via automatic tunnels 32.

Figure 2:
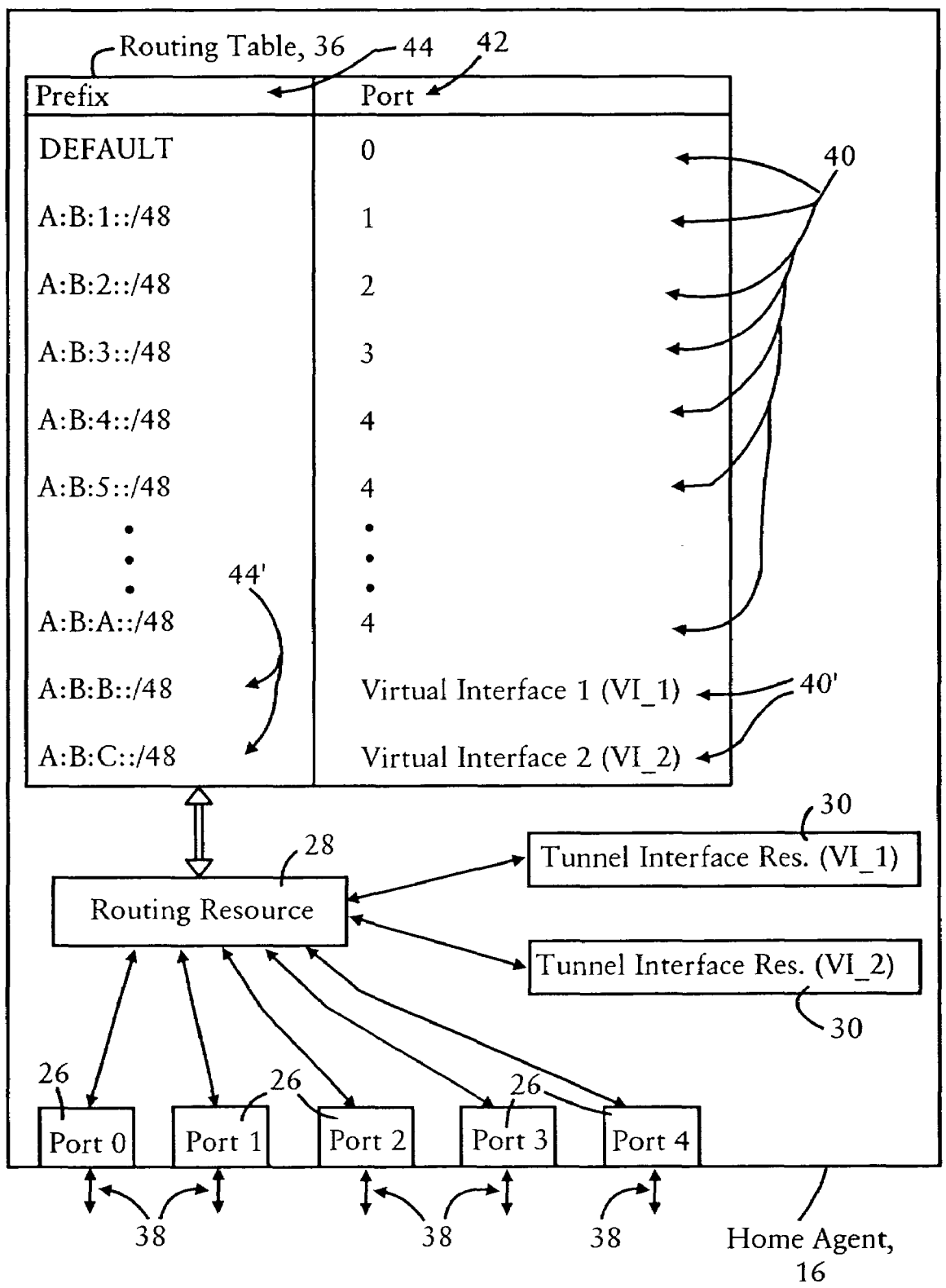
FIG. 2 illustrates an example home agent in the system illustrated in FIG. 1.

FIG. 2 is a diagram illustrating an example of the home agent 16 of FIG. 1. The home agent 16 includes the routing resource 28, a routing table 36, multiple network ports 26, and at least one tunnel interface resource 30. Each network port 26 is configured for sending and receiving link layer packets (e.g., Ethernet/IEEE 802.3 or IEEE 802.11) via respective network links 38, which may be wired or wireless network links. Each network port 26 includes an executable link layer resource configured for adding link layer headers (e.g., Ethernet headers) to IP packets output from the routing resource 28, and removing link layer headers from received link layer packets carrying received IP packets and that are received from a network link 38. The received IP data packets are output from the network port 26 to the routing resource 28 for routing.

The home agent 16 includes a routing table 36 configured for storing routing table entries 40 and 40'. Each routing table entry 40 and 40' specifies a corresponding output resource 42 and a corresponding destination 44 or 44'. Each output resource 42 may specify an output resource 42 in the form of either an output port 26 (as in the case of entries 40), or an identified tunnel interface resource 30 (as in the case of entries 40'), also referred to as a "virtual interface" (VI).

The identified destinations 44 and 44' include address prefixes that are reachable by the router 16 of FIG. 1 via output resources 42, plus a single "default" entry for outputting IP packets destined outside any of the identified destinations 44 or 44' to the Internet 18. As illustrated in FIG. 2, the routing table 36 includes routing table entries 40 that specify that IP packets having destination addresses within the range of "A:B:1::/48" to "A:B:A::/48" are output onto one of the network ports "Port 1", "Port 2", Port 3" or "Port 4" 26. The routing table 36 also includes routing table entries 40' specifying that an IP packet having a destination address starting with a prescribed mobile aggregation prefix of "A:B:B::/48" 44' or "A:B:C::/48" 44' should be output to the tunnel interface resource "VI_1" or "VI_2", respectively. As apparent from the foregoing, the routing table 36 can have a minimum of two entries, namely the default entry, and the entry identifying the mobile aggregation prefix "A:B:C::/48" 44' reachable via the virtual interface "VI_2" 30.

The routing resource 28 is configured for outputting a received IP data packet based on identifying a routing table entry 40 from the routing table 36 determining a longest matching prefix entry. Hence, in response to the routing resource 28 receiving a data packet that specifies a destination IP address starting with the prescribed mobile aggregation prefix "A:B:B::/48" as the longest matching prefix 44' in the routing table 36, the routing resource 28 delivers (i.e., outputs to a local resource) the received IP data packet to the tunnel interface resource "VI_1" 30; in response to the routing resource 28 receiving a data packet that specifies the destination IP address starting with the prescribed mobile aggregation prefix "A:B:C::/48" as the longest matching prefix 44' in the routing table 36, the routing resource 28 delivers the received IP data packet to the tunnel interface resource "VI_2" 30.

Figure 3:
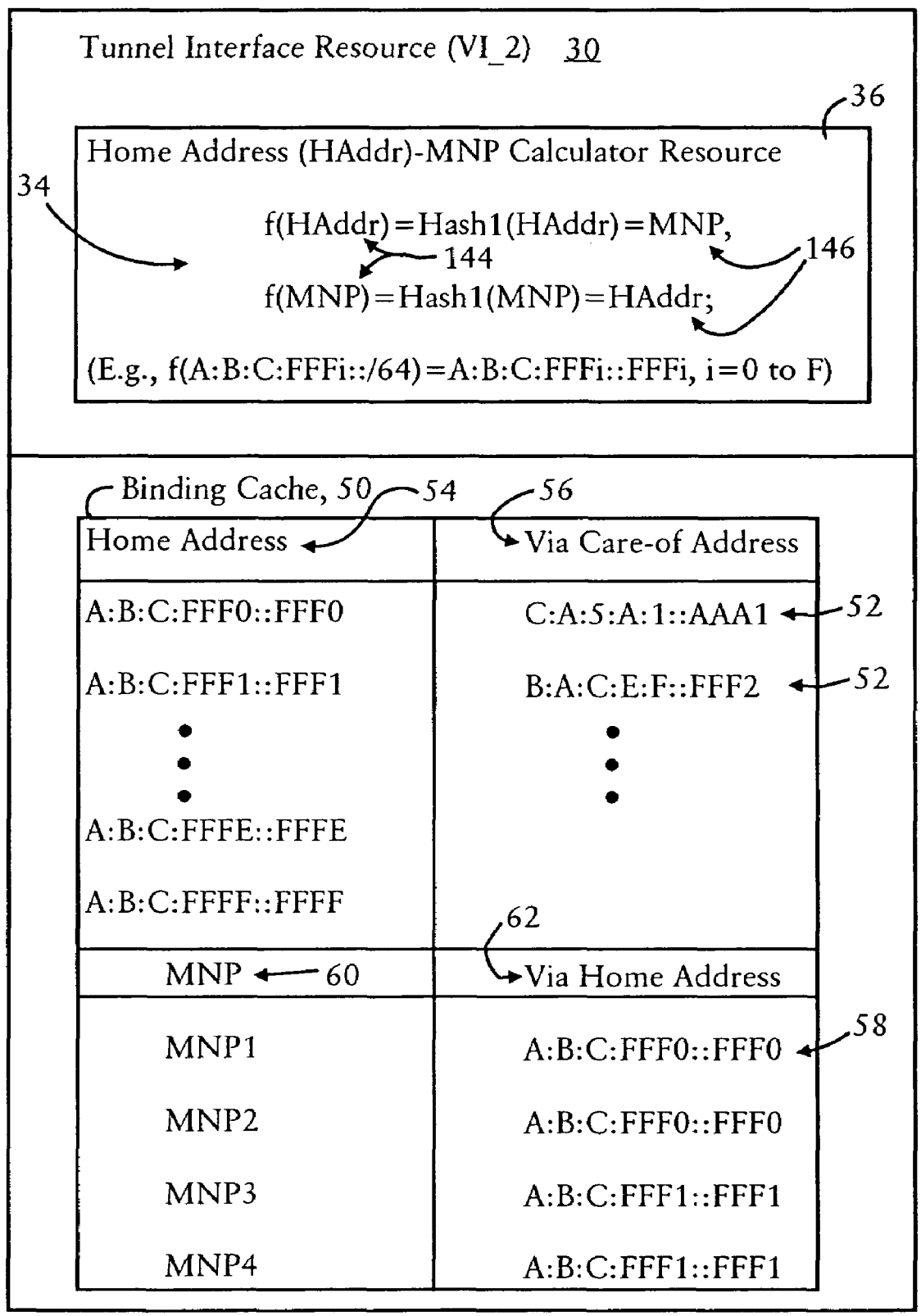
FIG. 3 illustrates an example tunnel interface resource and binding cache in the home agent of FIG. 1.

FIG. 3 is a diagram illustrating the tunnel interface resource (e.g., "VI_2") 30 of FIGS. 1 and 2. As described above with respect to FIG. 2, the tunnel interface resource "VI_2" 30 is configured for performing all home agent operations with respect to mobile routers 14 and mobile network prefixes 24 assigned within the prescribed mobile aggregation prefix "A:B:C::/48" 44'. In particular, the tunnel interface resource 30 of FIG. 3 implements the prescribed mapping function 34 in the form of a home address to mobile network prefix calculator resource 36, where the prescribed mapping function 34 can be implemented as a reversible hash function that can generate a mobile network prefix 24 from a supplied home address (HAddr) (e.g., f(HAddr)=MNP), and which can generate a home address (HAddr) from a supplied mobile network prefix 24 (e.g., f(MNP)=HAddr). In particular, the specific relationship between a home address (HAddr) of a mobile router and its assigned mobile network prefixes 24 are defined by the prescribed mapping function 34; hence, the prescribed mapping function 34 establishes the mobile network prefixes that can be used for a given home address, and the home addresses that can be used for a given mobile network prefix.

As illustrated in FIG. 3, the prescribed mapping function 34 in one example can be implemented as a function f(x) providing a one-to-one (1:1) mapping such that a single input 144 results in a single output 146. The prescribed mapping function 34 also may be applicable to a larger 25 address prefix that contains multiple mobile network prefixes; hence, if a 60-bit prefix as illustrated in FIG. 3 is to be used for building a 16:16 mapping between mobile network prefixes and home addresses, then sixteen (16) specific 64-bit mobile network prefixes 24 can be mapped by the mapping function 34 to sixteen (16) specific home addresses, respectively (e.g., f(A:B:C:FFFi::/64)=A:B:C:FFFi::FFFi, i=0 to F). For example, the prescribed mapping function 34 can be implemented based on extracting the first number of bits (e.g., 64) from the beginning of an identified address (e.g., the destination address of a received packet), and applying the first number of bits in a prescribed manner to generate a suffix for generation of a home address that is authorized to provide reachability for the prefix specified from the first number of bits. Additional examples of generating a home address from a prescribed function 34 are illustrated in U.S. Pat. No. 6,917,618, and U.S. Patent Publication No. 2004/0223491.

Hence, this example of implementing the prescribed mapping function 34 as a function f(x) providing a one-to-one mapping is beneficial in automatically implementing mobile network tunnels 32 for mobile network topologies requiring a single home address assigned to a corresponding mobile network prefix; hence, the function f(x) 34 maps a mobile network prefix "A:B:C:FFFi::/64" 24 to the home address "A:B:C:FFFi::FFFi" where the value "i" is any value from "0" to "F" (hexadecimal). In other words, the tunnel interface "VI_2" 30, in response to receiving a packet within the prescribed assigned aggregation of "A:B:C::/48", is able to map sixteen 64-bit mobile network prefixes to sixteen home addresses, eliminating the necessity of manual configuration of the home addresses to the mobile network prefixes in the home agent 16.

Figures 5, 6:
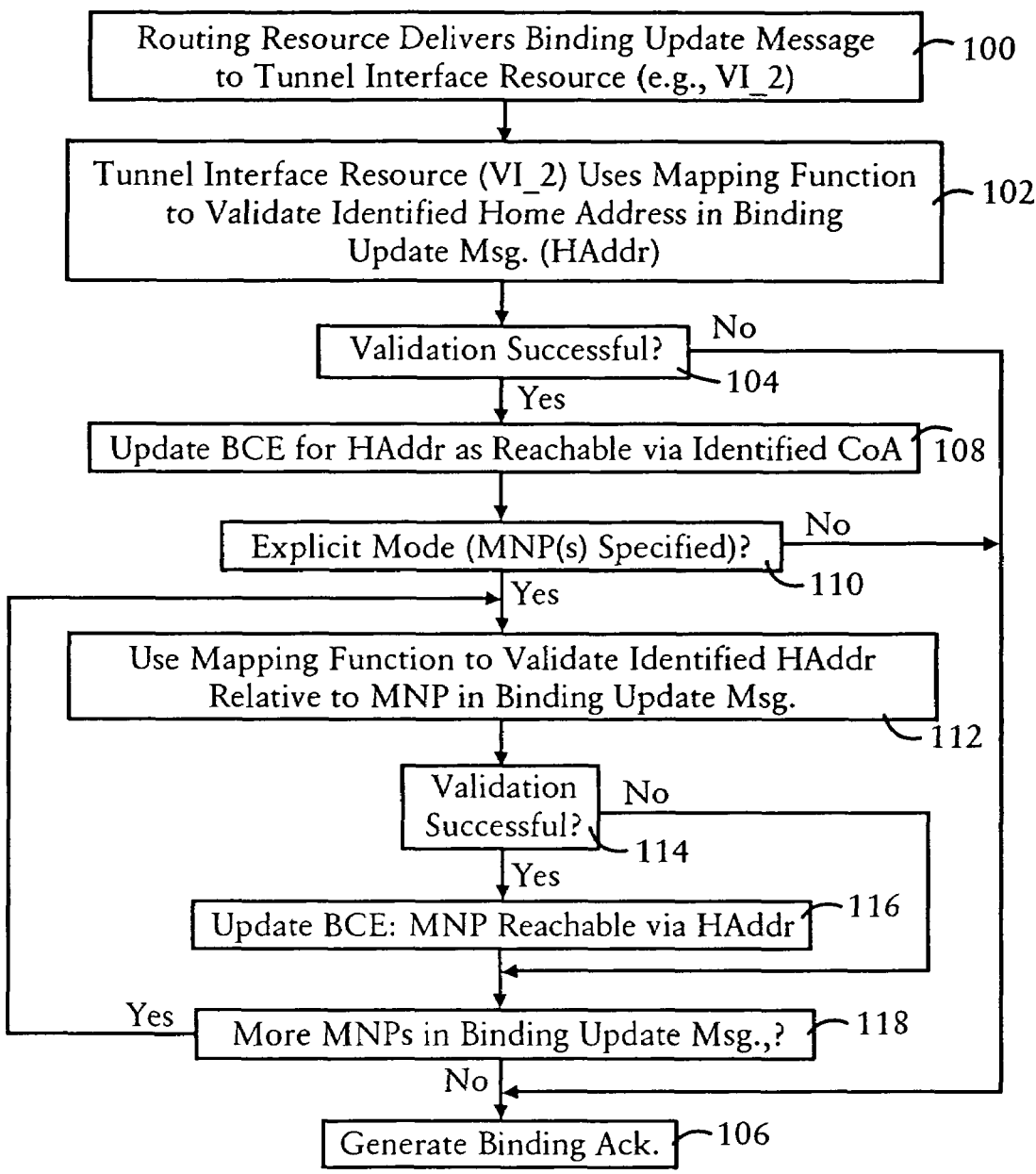
FIG. 5 illustrates authorization of binding update messages by the tunnel interface resource of FIG. 3
FIG. 6 illustrates another example mapping function in the example tunnel interface resource of FIG. 3.

As illustrated in FIG. 6, the prescribed mapping function 34 also may be implemented in another example as a function g(x) configured for generating multiple output values 148 for a given input 44; hence, a single address prefix may be used to identify multiple home addresses for reaching the single address prefix; similarly, a single home address may be used to identify multiple address prefixes that are reachable via the single home address. Use of a mapping function 34 that generates multiple output values for a given input value may be particularly beneficial in a mobile network deployment where a mobile router 14 is provides reachability for multiple mobile network prefixes 24, or where multiple home addresses provide reachability for a given mobile network prefix, such as the multihoming example of FIG. 7, where both mobile routers "MR1" and "MR2" provide concurrent reachability to the mobile network prefixes "MNP2" (where "MNP2"="MNP3") 24.

Figure 8:
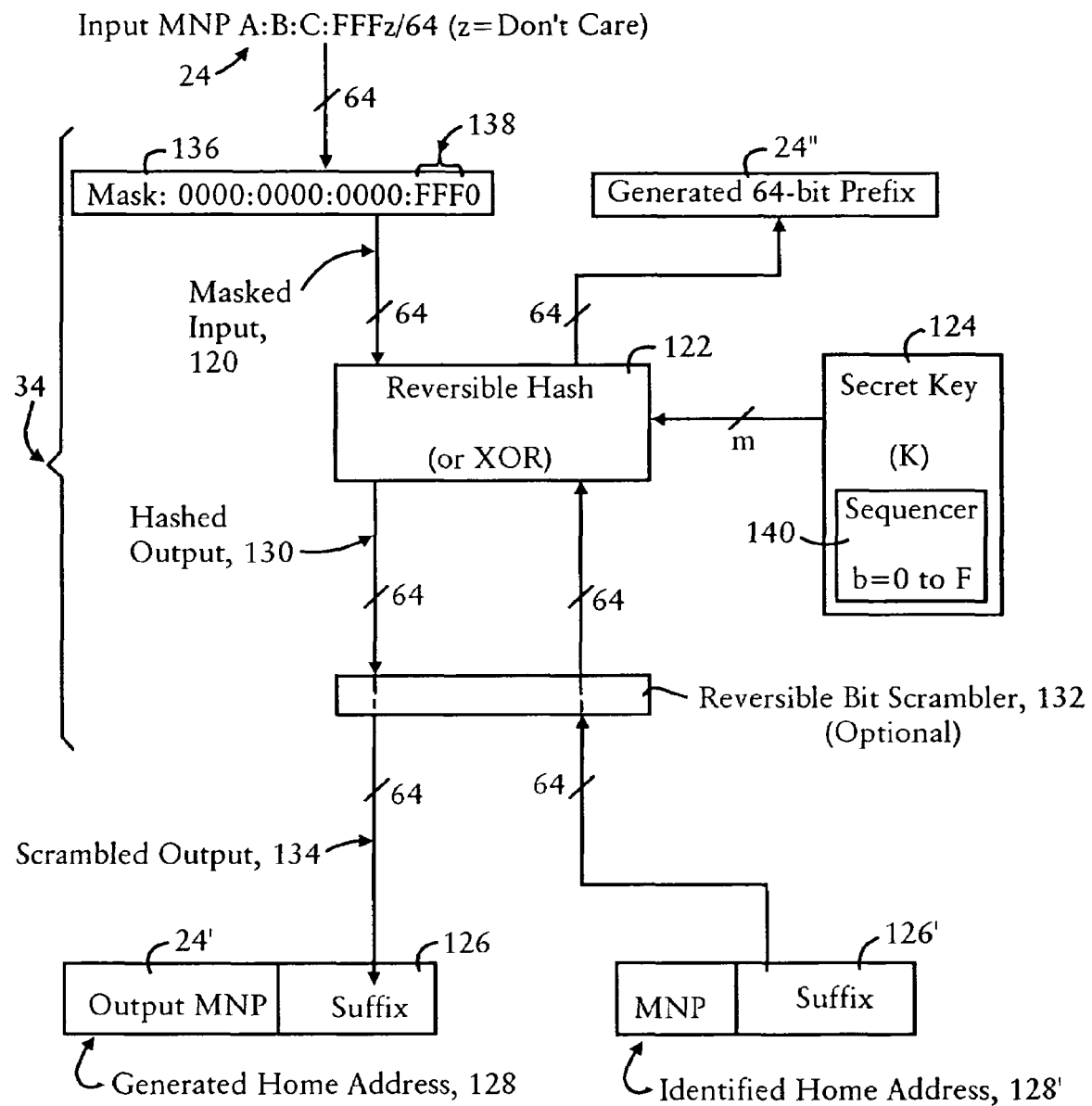
FIG. 8 illustrates another example mapping function in the example tunnel interface resource of FIG. 3.

FIG. 8 illustrates yet another example of the prescribed mapping function 34, where at least a portion 120 of the retrieved 64-bit mobile network prefix 24 is applied to the mapping function 34 that performs a hashing (or Exclusive OR (XOR)) operation 122 using a secret key (K) 124 to generate a 64-bit suffix 126 for a home address (HAddr) 128.

The hashed output 130 from the hash operation 122 optionally may be scrambled by a reversible bit scrambler 132, providing added security by generating a scrambled output 134 for use as the suffix 126 of the home address 128.

A particular advantage of the mapping function 34 of FIG. 8 is that the mobile network prefix 24' of the home address 128 need not be the same as the input mobile network prefix 24 supplied for hashing 122; hence, the mapping function 34 can be used for deployment of mobile routers 14 having assigned home addresses 128 that are not within the address prefix range of the mobile network prefixes 24 served by the mobile routers 14 (i.e., the mobile router home address is distinct from the mobile network prefixes served by the mobile router), as illustrated as an "extended home network" in the above-identified Internet Draft by Thubert et al. entitled "NEMO Home Network Models".

The simplest implementation of the mapping function 34 of FIG. 8 can include applying the entire 64-bit mobile network prefix 24 ("A:B:C:FFFz/64", where "z" is a "Don't Care") to the operator 122, which performs an Exclusive-OR operation using a 64-bit secret key 124 (m=64) to generate the output 130. Likewise, the suffix 126' from an identified home address 128' (e.g., retrieved from a binding update message, described below) can be used to generate a generated 64-bit address prefix 24": the generated 64-bit address prefix 24" can then be used to validate whether the identified home address 128' is a valid home address for a mobile router within the mobile aggregation prefix 44' (e.g., if the generated address prefix 24" is contained within the address realm of the mobile aggregation prefix 44' assigned to the tunnel interface resource 30).

Enhancements to provide greater security include masking the 64-bit input mobile network prefix 24 with a selected mask 136 (bitwise AND), resulting in supplying the masked input 120 to the reversible hash operation 122. Use of a mask 136 enables a selected portion of the mobile network prefix 24 to be hashed, for example the 12-bit portion 138 that uniquely distinguishes a 60-bit aggregation prefix within the 48-bit mobile aggregation prefix 44'. The use of the selected portion 120 provides greater security by hiding the mobile aggregation prefix 44', enabling the network to be hidden.

Further, the secret key 124 can be modulated using a sequencer 140 to produce multiple hashed values from a single input, for example where selected bits (e.g., b=4 bits within the m bits) are incremented through the sequence "0" through "F" (hexadecimal) in order to generate sixteen (16) unique home addresses 128 from the single masked input 120. The selected bits (b) need not be contiguous, but may be distributed throughout the m bits of the secret key 124. Hence, a single masked input 120 (e.g., the 12-bit portion 138 uniquely identifying the relevant 60-bit aggregation prefix) can be used to generate sixteen (16) home addresses 128, each having the same output mobile network prefix 24', based on the sequencer 140 incrementing the selected bits (b) in the secret key 124. The same sequence can be applied to the suffix 126' to generate sixteen (16) possible address prefixes 24" to be used for validating the home address 128, where the identified home address 128' is validated if any one of the sixteen (16) generated prefixes 24" match the prescribed validation criteria, described below.

Consequently, FIGS. 3, 6 and 8 illustrate that various mapping functions 34 may be used to identify a mobile network prefix or home address, depending on implementation. Moreover, use of mapping functions 34 enable the deployment of the mobile networks 27 and implementation of the automatic mobile IP tunnels 32, without manual configuration of the home addresses or mobile network prefixes in the home agent 16. Also note that a given mobile router 14 may be assigned either a single home address, or multiple home addresses, depending on the preferred deployment.

As illustrated in FIG. 3, the tunnel interface resource 30 is configured for accessing an associated binding cache 50 for the aggregation that is assigned to the tunnel interface resource 30, for example the mobile aggregation prefix "A:B:C::/48" 44' for the tunnel interface resource "VI_2" illustrated in FIG. 3. As described below with respect to FIG. 5, the tunnel interface resource 30 is configured for selectively updating the binding cache 50 with a binding cache entry 52 that specifies a stored home address 54 is reachable via a corresponding stored care-of address 56, based on validating the home address specified in the received binding update message. The tunnel interface resource 30 also is configured for selectively updating the binding cache 50 with a binding cache entry 58 that stored mobile network prefixes 60 are reachable via stored at home addresses 62, based on validating the home address identified in the explicit binding update message relative to the mobile network prefixes identified in the explicit binding update message. Alternately, the mobile network prefixes 60 and the home addresses 62 may be implemented as a "private routing table" for use by the tunnel interface resource 30.

Figure 4:
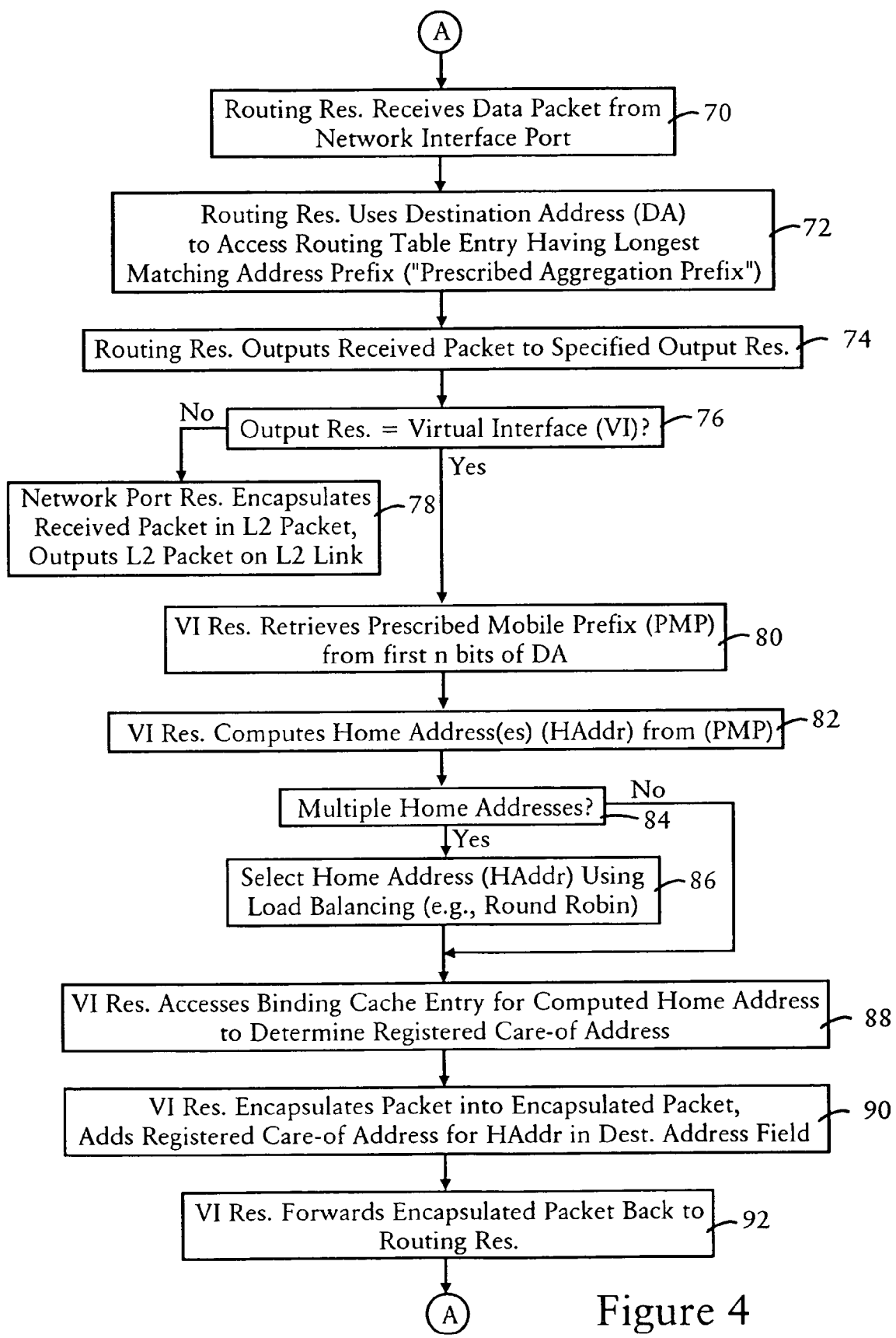
FIG. 4 illustrates an example method for implementing the automatic tunnels by the home agent of FIG. 1.

FIG. 4 illustrates an example method for implementing the automatic tunnels 32 by the tunnel interface resource 30 of FIG. 1. The steps described herein with respect to FIGS. 4, as well as FIG. 5, can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The method begins in step 70, where the routing resource 28 receives an IP data packet from one of the network interface ports 26, where the corresponding network interface port 26 has removed the link layer header (e.g., Ethernet header) and any error check fields (e.g., cyclic redundancy check (CRC) field) appended at the end of the IP datapacket, and forwarded the received IP packet to the routing resource 28 for routing. As described with respect to FIG. 1, the home agent 16 receives all data packets having a destination IP address starting with the assigned mobile aggregation prefix "A:B:C::/48" 44' for the home agent 16. As apparent from FIG. 2, other address prefixes may be advertised as reachable.

The routing resource 28 retrieves the destination IP address from the received IP data packet and identifies in step 72 the routing table entry 40 or 40' having the longest matching address prefix 44 or 44', and outputs in step 74 the received IP data packet to the corresponding output resource 42 specified in the matching routing table entry 40 or 40'. If in step 76 the routing resource outputs the received IP data packet to an output port 26, the corresponding output port 26 encapsulates in step 78 the received IP packet into a layer 2 packet having a link layer source and destination address (and any necessary CRC field), and outputs the layer 2 packet onto the corresponding layer 2 link 38.

Assume in step 70 that the routing resource 28 receives a data packet having a destination address field specifying an IPv6 destination address of "A:B:C:FFF0:EFEC::2135", which is the home address of a mobile host attached to the mobile router "MR1" 14 of FIG. 1. Since in step 76 the destination address falls within the prescribed mobile aggregation prefix 44' for one of the virtual interfaces 30 (e.g., the destination address "A:B:C:FFF0:EFEC::2135" falls within the prescribed aggregation prefix "A:B:C::/48" 44', the routing resource 28 outputs the received IP packet to the corresponding virtual interface ("VI_2") specified in the matching routing table entry 40'.

As described above with respect to FIG. 3, the tunnel interface resource (e.g., "VI_2") 30 is configured for executing home agent operations for the mobile networks 27 within the assigned mobile aggregation prefix "A:B:C::/48" 44'. Hence, the virtual interface resource 30 is configured for computing a home address for a mobile router 14 based on applying a prescribed mapping function 34. Specifically, the virtual interface resource 30 retrieves in step 80 a prescribed mobile network prefix (PMP) starting from the first "n" bits of the destination address, for example the first sixty-four bits (n=64) of the destination address "A:B:C:FFF0:EFEC::2135" resulting in the retrieved mobile network prefix "A:B:C:FFF0::/64" 24 (which is a second address prefix contained within the aggregation prefix "A:B:C::/48" 22 assigned to the tunnel interface resource 30). The tunnel interface resource 30 applies the calculation resource 36 in order to compute in step 82 a home address (HAddr) for the mobile router that provides reachability for the mobile network prefix "A:B:C:FFF0::/64" 24 retrieved from the destination address "A:B:C:FFF0:EFEC::2135" of the received IP packet.

As described above with respect to FIGS. 6 and 8, the prescribed mapping function 34 may be configured for generating multiple home addresses for reaching the single mobile network prefix retrieved from the destination address of the received IP packet. If in step 84 the tunnel interface resource 30 detects that multiple home addresses are generated from the mobile network prefix retrieved from the destination address of the received IP packet, the tunnel interface resource 30 selects in step 86 one of the computed home addresses using a prescribed home address selection criterion, for example a load-balancing selection schemes such as round-robin selection from among the registered home addresses. Assume for simplicity, however, that the prescribed mapping function 34 results in the generation of the home address value of "A:B:C:FFF0::FFF0" from the mobile network prefix "A:B:C:FFF0::/64".

In response to the tunnel interface resource 30 having calculated the home address value of "A:B:C:FFF0::FFF0" from the mobile network prefix "A:B:C:FFF0::/64" in step 82, the tunnel interface resource 30 accesses in step 88 the binding cache 50 in order to retrieve the stored care-of address 56 having been registered with the corresponding stored home address 54. As described below with respect to FIG. 5, the tunnel interface resource 30 also updates the binding cache 50 with binding cache entries 52 specifying stored home addresses 54 reachable via stored care-of addresses 56 based on validating binding updates from the mobile routers 14. Hence, the tunnel interface resource 30 determines in step 88 that the calculated home address value "A:B:C:FFF0::FFF0" is reachable via the stored care-of address "C:A:5:A:1::AAA1" 56. The tunnel interface resource 30 encapsulates in step 90 the received IP packet (specifying the destination address value of "A:B:C:FFF0:EFEC::2135") with a mobile IP routing header that includes a destination address field specifying the care-of address "C:A:5:A:1::AAA1" 56 for the mobile router "MR1", and a source address field specifying the address of the home agent 16. The tunnel interface resource 30 forwards the encapsulated packet back to the routing resource 28 in step 92, which repeats steps 70, 72, 74 in order to output the encapsulated packet in step 78 via its default network port "Port 0" 26 in step 78.

Hence, the tunnel interface resource 30 automatically encapsulates a received IP packet based on automatically calculating the home address (e.g., 128 of FIG. 8) for the mobile router providing reachability for the destination prefix, and determining the care-of address for the calculated home address. Consequently, home agent operations can be automatically implemented in the tunnel interface resource 30 without manual configuration of home addresses to mobile network prefixes, and without the necessity of storing state dependent information, such as storage of dynamically assigned home addresses and mobile network prefixes for a given mobile router. Rather, since the entire mobile network topology and the home address-mobile network prefix associations are defined by the prescribed mapping function 34, the home agent operations can be automatically performed based on applying the mobile network prefix to the prescribed mapping function 34.

FIG. 5 illustrates an example of authorization of binding update messages by the tunnel interface resource 30. Similar to steps 70, 72, and 74 of FIG. 4, the routing resource 28 delivers in step 100 a received binding update message to the tunnel interface resource ("VI_2") 30 in response to the received binding update message specifying a destination address that starts with the prescribed mobile aggregation prefix "A:B:C::/48" 44', for example the IP address for the home agent 16. The tunnel interface resource 30, in response to detecting the binding update message, needs to validate the received binding update message, regardless of whether the binding update message is an implicit binding update message or an explicit binding update message as specified in RFC 3963. Hence, steps 102 and 104 are performed for both implicit and explicit binding update messages.

The tunnel interface resource 30 validates in step 102 that the identified home address in the binding update message is an authorized home address, using the mapping function 34. The nature of the validation depends on the implementation of the mapping function 34: for example, in the case of a 1:1 mapping (illustrated in FIG. 3), the tunnel interface 34 may generate in step 102 a test home address (T_HAddr) using the prescribed mapping function 34 by retrieving the first sixty-four prefix bits from the identified home address (HAddr) in the binding update message (which may be expressed either within the source address field of the received binding update message, or within the home address option field, as specified in RFC 3775 at Section 9.5.1); the tunnel interface resource 30 may then apply the retrieved prefix bits from the identified home address to the prescribed mapping function 34 in order to generate the test home address (T_HAddr), where validation is successful in step 104 if the test home address (T_HAddr) matches the specified home address (HAddr) in the binding update message. If the prescribed mapping function 34 generates a plurality of test home addresses (as in FIG. 6), the tunnel interface resource 30 may determine whether validation is successful based on whether there is a match between the specified home address (HAddr) and any one of the test home addresses.

Validation also may be performed in step 102 using the mapping function 34 of FIG. 8, where the tunnel interface resource 30 generates the 64-bit prefix 24" from the suffix 126' of the specified home address (HAddr) in the binding update message, and determines in step 104 whether the generated prefix 24" matches prescribed validation criteria, depending on implementation of the mask 136 or the secret key 124. For example, the prescribed validation criteria in step 104 may require the generated prefix 24" to match a specific 64-bit prefix (e.g., a mobile network prefix reserved exclusively for home addresses in the case of a NEMO extended home network), the 48-bit mobile aggregation prefix 44', or match one prefix from a list of intermediate (e.g., 60-bit) address prefix; in the case of multiple generated prefixes 24" (based on the sequencer 140 generating multiple keys 124), the prescribed validation criteria may require at least one of the multiple generated prefixes 24" matching a certain prefix.

If in step 104 the identified home address in the binding update message fails the validation test, the tunnel interface resource 30 rejects the binding update message and generates in step 106 a binding acknowledgment message back to the source specifying that the binding update was not completed.

If, however, the tunnel interface resource 30 detects the identified home address (HAddr) in the binding update message passes validation in step 104, the tunnel interface resource 30 updates in step 108 the binding cache 50 with a binding cache entry 52 that specifies that the identified home address (HAddr) in the binding update message is reachable via an identified care-of address specified in the received binding update message. If in step 110 the tunnel interface resource determines that no mobile network prefixes (MNPs) are specified in the binding update message, i.e., the binding update message does not use explicit mode, the tunnel interface resource 30 generates in step 106 a binding acknowledgment indicating that the binding cache 50 has been updated accordingly.

For explicit mode, if in step 110 the tunnel interface resource 30 detects a mobile network prefix option that specifies at least one mobile network prefix, the tunnel interface resource 30 uses the mapping function 34 to validate in step 112 that the identified home address is authorized to provide reachability to the at least one mobile network prefix. As described above with respect to steps 102 and 104, various validation procedures may be implemented, such as: using the prescribed mapping function 34 of FIG. 3 or 6 to compute a computed home address (CHAddr) from the mobile network prefix specified in the mobile network prefix option of the binding update message, and determining in step 114 whether the identified home address in the binding update message matches the computed home address (CHAddr); alternately, the tunnel interface resource 30 may supply the mobile network prefix specified in the binding update message to the mapping function 34 of FIG. 8 to determine in step 114 whether the generated home address 128 (or any one of the multiple generated home addresses if the sequencer 140 is used) matches the identified home address in the binding update message.

If the tunnel interface resource 30 determines in step 114 that validation was successful, the tunnel interface resource 30 updates in step 116 the bind cache entry to specify that the corresponding mobile network prefix 60 specified in the binding update message is reachable via the specified home address, and repeats in step 118 revalidation for each successive mobile network prefix specified in the binding update message. If in step 114 the home address (HAddr) fails validation relative to the mobile network prefix 60 and the prescribed mapping function 34, the tunnel interface resource 30 skips the updating of the binding cache 50 in step 116, and repeats for any other mobile network prefixes in step 118, prior to generating the appropriate binding acknowledgment in step 106. The binding acknowledgment message generated in step 106 is output by the tunnel interface resource 30 back to the routing resource 28 for output according to the routing table 36.

Figure 7:
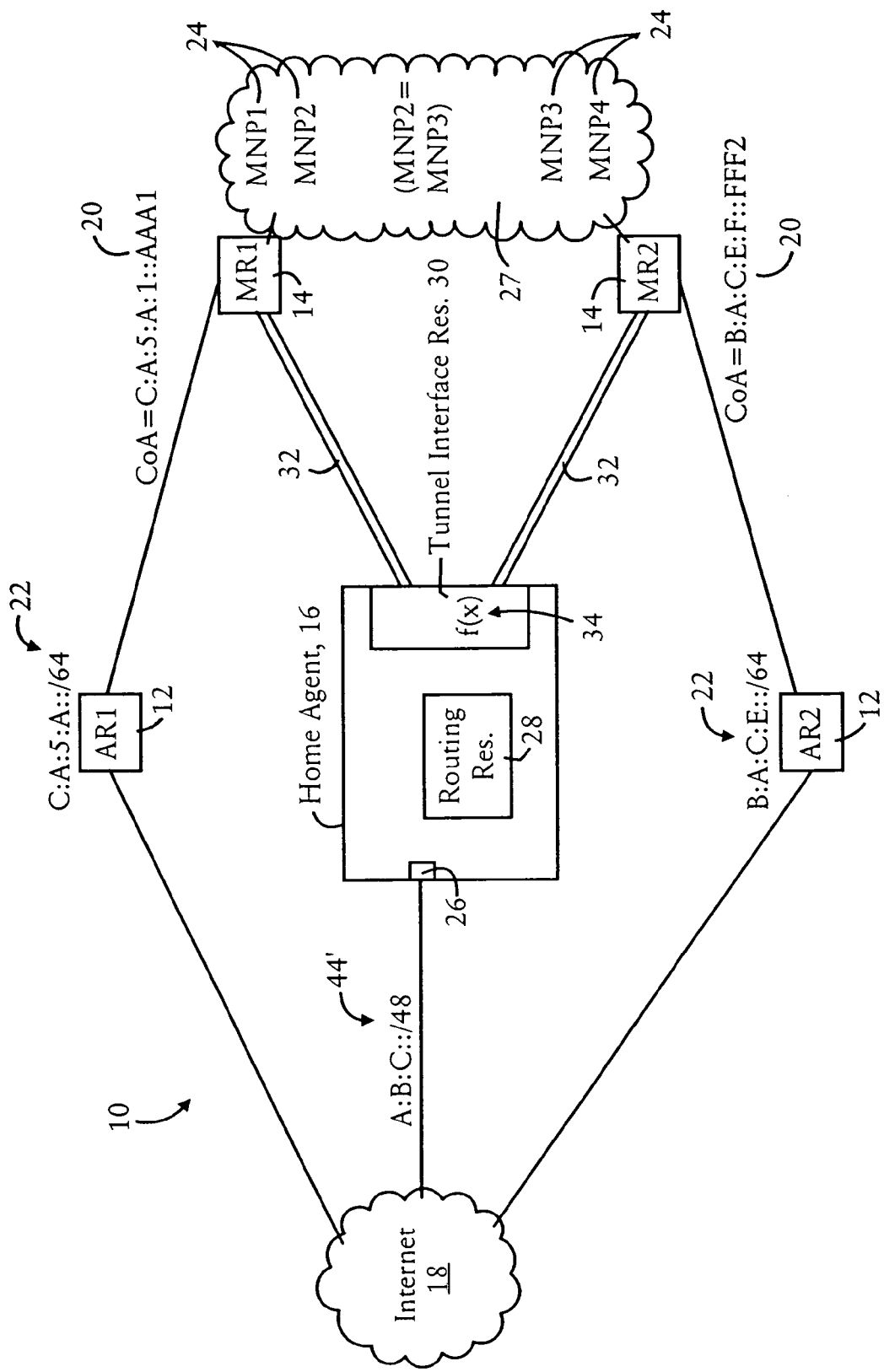
FIG. 7 illustrates another example network including a home agent and mobile routers for implementing automatic tunnels to reach a multi-homed network according to another example embodiment.

As described above, a set of mobile networks (based on the mobile network prefixes) and a set of home addresses can be defined based on the prescribed mapping function 34. Hence, a home agent 16 can be implemented by adding to any router a tunnel interface resource 30 that includes a mapping function 34 that defines the relationship between the mobile network prefixes and the home addresses. The home addresses can be assigned to the mobile routers as desired, resulting in mobile routers using distinct home addresses for distinct mobile network prefixes, a single home address for reaching multiple mobile network prefixes (as illustrated in FIG. 1 and the entries 58 of FIG. 3), or multiple home addresses for reaching a given mobile network prefix according to a multi-homing topology, as illustrated in FIG. 7, or according to a load-balancing protocol, enabling multiple home addresses to be used to reach a given mobile network prefix via respective connections.

In addition, the use of the prescribed mapping function 34 within the tunnel interface resource 30 allows multiple forms of mobile network deployments to be implemented simply based on the mapping function that is used.

What is claimed is:

1. A method comprising:
   delivering a received data packet by a routing resource to a tunnel interface resource in response to the routing resource determining that the received data packet specifies a destination address starting with a prescribed aggregation prefix;
   computing, by the tunnel interface resource, a home address for a mobile router based on a second address prefix from a start of the destination address, the second address prefix contained within the prescribed aggregation prefix and having been assigned as reachable by the mobile router, the home address computed based on the tunnel interface resource applying at least a portion of the second address prefix to a prescribed mapping function;
   determining by the tunnel interface resource a care-of address for reaching the mobile router based on the corresponding home address having been calculated by the tunnel interface resource; and
   encapsulating, by the tunnel interface resource, the received data packet into an encapsulated packet having a destination address field specifying the care-of address, for output of the encapsulated packet toward the mobile router.

2. The method of claim 1, wherein the routing resource and the tunnel interface resource are executed in a router having been assigned the prescribed aggregation prefix, the method further comprising receiving the received data packet by the router, and outputting the encapsulated packet by the router.

3. The method of claim 1, further comprising:
   forwarding the encapsulated packet by the tunnel interface resource to the routing resource; and
   outputting the encapsulated packet by the routing resource to an identified output port based on accessing a routing table specifying use of the identified output port.

4. The method of claim 1, wherein the determining includes accessing by the tunnel interface resource a binding cache having binding cache entries specifying stored home addresses reachable via respective stored care-of addresses, the method further comprising:
   delivering a received binding update message by the routing resource to the tunnel interface resource in response to the received binding update message specifying a second destination address starting with the prescribed aggregation prefix; and
   selectively updating by the tunnel interface resource the binding cache with a binding cache entry that specifies that an identified home address specified in the received binding update message is reachable via an identified care-of address specified in the received binding update message, based on validating the identified home address relative to the prescribed mapping function and the prescribed aggregation prefix.

5. The method of claim 4, wherein the received binding update message includes a mobile network prefix option that specifies at least one mobile network prefix, the updating including:
   validating the identified home address relative to the at least one mobile network prefix and the prescribed mapping function; and
   updating the binding cache to specify the at least one mobile network prefix is reachable via the identified home address in response to the validating that the identified home address relative to the at least one mobile network prefix.

6. The method of claim 5, wherein the mobile network prefix option specifies a plurality of said mobile network prefixes, the updating including validating the identified home address for each of the mobile network prefixes specified in the mobile network prefix option relative to the prescribed mapping function, and updating the binding cache for each said mobile network prefix having been validated relative to the identified home address and the prescribed mapping function.

7. The method of claim 1, wherein the computing includes generating a plurality of the home addresses for reaching the second address prefix, the determining including accessing a binding cache having binding cache entries specifying care-of addresses for reaching the respective home addresses, the determining further including selecting one of the home addresses computed by the tunnel interface resource according to a prescribed home address selection criterion, and retrieving the corresponding care-of address of the selected one home address for insertion into the destination address field of the encapsulated packet.

8. The method of claim 7, wherein at least one of the home addresses computed by the tunnel interface resource is assigned to a second mobile router providing reachability to the second address prefix, the mobile router and the second mobile router providing concurrent reachability to the second address prefix.

9. The method of claim 7, wherein the prescribed home address selection criterion is based on a prescribed load balancing selection among the plurality of home addresses for reaching the second address prefix.

10. The method of claim 1, wherein the prescribed mapping function is a prescribed reversible hash function that generates the second address prefix based on applying the home address to the prescribed hash function.

11. An apparatus comprising:
    a tunnel interface resource executed by the apparatus; and
    a routing resource executed by the apparatus and configured for delivering a received data packet to the tunnel interface resource in response to the routing resource determining that the received data packet specifies a destination address starting with a prescribed aggregation prefix;
    the tunnel interface resource configured for computing a home address for a mobile router based on a second address prefix from a start of the destination address, the second address prefix contained within the prescribed aggregation prefix and having been assigned as reachable by the mobile router, the tunnel interface resource configured for computing the home address based on applying at least a portion of the second address prefix to a prescribed mapping function;
    the tunnel interface resource further configured for determining a care-of address for reaching the mobile router based on the corresponding home address having been calculated by the tunnel interface resource; and
    the tunnel interface resource further configured for encapsulating the received data packet into an encapsulated packet having a destination address field specifying the care-of address, for output of the encapsulated packet toward the mobile router.

12. The apparatus of claim 11, further comprising a routing table configured for storing routing table entries, each routing table entry specifying a corresponding output resource for a corresponding identified destination, wherein:
    the tunnel interface is configured for forwarding the encapsulated packet to the routing resource;
    the routing resource is configured for outputting the encapsulated packet to one of the output resources in response to identifying a corresponding one of the identified destinations as reachable for the specified care-of address; and
    one of the routing table entries specify the tunnel interface resource as the corresponding output resource for the prescribed aggregation prefix.

13. The apparatus of claim 11, further comprising:
    a routing table accessible by the routing resource and including an entry identifying the tunnel interface resource as an output resource for the prescribed aggregation prefix; and
    a binding cache having binding cache entries specifying stored home addresses reachable via respective stored care-of addresses;
    the routing resource configured for delivering a received binding update message to the tunnel interface resource in response to the received binding update message specifying a second destination address starting with the prescribed aggregation prefix; and
    the tunnel interface resource configured for selectively updating the binding cache with a binding cache entry that specifies that an identified home address specified in the received binding update message is reachable via an identified care-of address specified in the received binding update message, based on validating the identified home address relative to the prescribed mapping function and the prescribed aggregation prefix.

14. The apparatus of claim 13, wherein the received binding update message includes a mobile network prefix option that specifies at least one mobile network prefix, the tunnel interface resource configured for:
    validating the identified home address relative to the at least one mobile network prefix and the prescribed mapping function; and
    updating the binding cache to specify the at least one mobile network prefix is reachable via the identified home address in response to the validating the identified home address relative to the at least one mobile network prefix.

15. The apparatus of claim 14, wherein:
    the mobile network prefix option specifies a plurality of said mobile network prefixes;
    the tunnel interface resource is configured for validating the identified home address for each of the mobile network prefixes specified in the mobile network prefix option relative to the prescribed mapping function;
    the tunnel interface resource further configured for updating the binding cache for each said mobile network prefix having been validated relative to the identified home address and the prescribed mapping function.

16. The apparatus of claim 11, further comprising a binding cache having binding cache entries, wherein the tunnel interface resource is configured for:
generating a plurality of the home addresses for reaching the second address prefix,
accessing the binding cache, the binding cache entries specifying care-of addresses for reaching the respective home addresses,
selecting one of the home addresses computed by the tunnel interface resource according to a prescribed home address selection criterion, and retrieving the corresponding care-of address of the selected one home address for insertion into the destination address field of the encapsulated packet.

17. The apparatus of claim 16, wherein at least one of the home addresses computed by the tunnel interface resource is assigned to a second mobile router providing reachability to the second address prefix, the mobile router and the second mobile router providing concurrent reachability to the second address prefix.

18. The apparatus of claim 16, wherein the prescribed home address selection criterion is based on a prescribed load balancing selection among the plurality of home addresses for reaching the second address prefix.

19. The apparatus of claim 11, wherein the prescribed mapping function is a prescribed reversible hash function that generates the second address prefix based on applying the home address to the prescribed hash function.

20. An apparatus comprising:
means for generating an encapsulated packet; and
means for delivering a received data packet to the means for generating in response to determining that the received data packet specifies a destination address starting with a prescribed aggregation prefix;
the means for generating further configured for computing a home address for a mobile router based on a second address prefix from a start of the destination address, the second address prefix contained within the prescribed aggregation prefix and having been assigned as reachable by the mobile router, the means for generating further configured for computing the home address based on applying at least a portion of the second address prefix to a prescribed mapping function;
the means for generating further configured for determining a care-of address for reaching the mobile router based on the corresponding home address having been calculated by the means for generating; and
the means for generating further configured for encapsulating the received data packet into the encapsulated packet, the encapsulated packet having a destination address field specifying the care-of address for output of the encapsulated packet toward the mobile router.

* * * * *

UNITED STATES PATENT AND TRADEMARK OFFICE
CERTIFICATE OF CORRECTION

PATENT NO. : 7,633,921 B2
APPLICATION NO. : 11/602292
DATED : December 15, 2009
INVENTOR(S) : Thubert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this

Twenty-first Day of December, 2010

David J. Kappos
*Director of the United States Patent and Trademark Office*